US008958193B2

(12) United States Patent
Veliadis

(10) Patent No.: US 8,958,193 B2
(45) Date of Patent: Feb. 17, 2015

(54) SYSTEM AND METHOD FOR PROVIDING OPTICALLY TRIGGERED CIRCUIT BREAKER

(71) Applicant: Northrop Grumman Systems Corporation, Fall Church, VA (US)

(72) Inventor: John V. Veliadis, Hanover, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 10 days.

(21) Appl. No.: 13/955,912

(22) Filed: Jul. 31, 2013

(65) Prior Publication Data
US 2014/0268465 A1 Sep. 18, 2014

Related U.S. Application Data

(60) Provisional application No. 61/794,147, filed on Mar. 15, 2013.

(51) Int. Cl.
*H02H 9/02* (2006.01)
*H03K 17/687* (2006.01)
*H02H 1/00* (2006.01)

(52) U.S. Cl.
CPC ...................................... *H02H 1/00* (2013.01)
USPC ......................................... 361/93.9; 327/430

(58) Field of Classification Search
USPC ......................................... 361/93.9; 327/430
See application file for complete search history.

(56) References Cited

U.S. PATENT DOCUMENTS

| 4,424,544 | A | | 1/1984 | Chang et al. |
|---|---|---|---|---|
| 4,658,322 | A | * | 4/1987 | Rivera ............................. 361/37 |
| 5,360,979 | A | * | 11/1994 | Joseph et al. .................. 250/551 |
| 6,335,538 | B1 | * | 1/2002 | Prutchi et al. .................. 250/551 |
| 8,130,023 | B2 | * | 3/2012 | Veliadis ........................ 327/430 |
| 2010/0277006 | A1 | | 11/2010 | Urciuoli |
| 2011/0267132 | A1 | | 11/2011 | Lubomirsky et al. |

* cited by examiner

*Primary Examiner* — Scott Bauer
(74) *Attorney, Agent, or Firm* — Andrews Kurth LLP; Matthew J. Esserman; Sean S. Wooden

(57) ABSTRACT

A system/method for providing an optically triggered circuit breaker is provided. The system comprises a junction field-effect transistor (JFET) and gate drive coupled to the JFET's gate. The gate drive applies voltage bias ($V_G$) to the gate and the gate drive is configured to bias $V_G$ so that the system allows current flow through the JFET in the Drain to Source or Source to Drain directions, or so that the system blocks voltages applied to the Drain and/or Source. The system also comprises a photodetector which detects light emitted by the JFET resulting from a fault condition. The photodetector transmits a signal to the gate drive to provide the selectively biased $V_G$ so that the system blocks voltages applied to the Drain and/or Source, in response to the light detection. A system/method for providing an optically triggered bidirectional circuit breaker comprising common source JFETs and two photodetectors is alternatively provided.

33 Claims, 12 Drawing Sheets

SYSTEM AND METHOD FOR PROVIDING OPTICALLY TRIGGERED CIRCUIT BREAKER

FIELD OF THE INVENTION

The present invention relates generally to the field of circuit breakers, and, more specifically, to systems for providing optically triggered circuit breakers.

BACKGROUND OF THE INVENTION

Inverters/rectifiers and DC/DC converters critical for supporting high-power, high-voltage systems, such as hybrid-electric ground vehicle propulsion systems, typically operate between two high voltage busses with bi-directional power flow of up to hundreds of kilowatts. To prevent system damage during fault conditions, bi-directional fault isolation, or power conditioning, is needed. Because mechanical contactors do not provide adequate actuation times and suffer severe degradation during repeated fault isolation, a solid-state circuit breaker (SSCB) is desirable.

To provide such a SSCB, and to enable such bi-directional power flow in a semiconductor device, the device should provide symmetric current flow in forward and reverse directions and blocking of a specified voltage in forward and reverse directions. In addition, the gate-drive of the bi-directional circuit should operate at high current-gain and high bandwidth with low conduction losses, should allow for fast switching, and should have small physical size, all of which contribute to the bi-directional circuit's efficiency.

For the circuit of FIG. 6 in no fault efficient circuit-breaker operation, current flows with all the vertical-channel junction gate field-effect transistor (JFET) pn-junctions turned off based on Eqs. (3) and (4) (see below). In a fault event, abrupt rise in drain current and voltage will occur. The gate-source JFET junctions are always off by default gate-drive biasing. For the JFET conducting in the drain-source direction, no bipolar current due to "fault condition" is generated as the increase in drain current/voltage biases the gate-drain pn-junction more negatively. For the JFET conducting in the source-drain (reverse) direction, however, bipolar current due to "fault condition" is generated as the increase in drain current/voltage biases the gate-drain pn-junction more positively. Once the built-in potential of the gate-drain junction is exceeded (Eq. (3) and (4) are no longer satisfied), bipolar gate current starts to flow and a rise in the gate-drive current is observed.

In addition to abrupt rise in current/voltage, a fault condition will also lead to higher JFET temperatures. JFETs have positive temperature coefficients and therefore the gate-drain pn-junction built-in potential is reduced with temperature; bipolar current will flow at lower voltages. For example, a SiC pn-junction with doping levels relevant to power applications turns on at ~2.7 V at room temperature. At 150° C., the junction will turn on at ~2.4 V. Typically, in no-fault conduction of 1000 A, the gate drive current is below 1 nA. Should a fault occur, the turned on gate-drain junction will conduct Amps if the circuit does not abruptly go into blocking mode.

Thus, a need exists to provide a system and method to detect a fault condition and bias the JFETs so that they operate as a solid state circuit breaker.

Therefore, it is desirable to provide a system and method for providing an optically triggered circuit breaker.

Advantages of the present invention will become more fully apparent from the detailed description of the invention hereinbelow.

SUMMARY OF THE INVENTION

The present invention is directed to a system for providing an optically triggered bidirectional circuit breaker. The system comprises a first junction field-effect transistor (JFET), wherein the first JFET includes a gate, drain ($D_1$), and source, and has gate-to-drain and gate-to-source built-in potentials. The system also comprises a second JFET, wherein the second JFET includes a gate, drain ($D_2$), and source, and has gate-to-drain and gate-to-source built-in potentials, and wherein the first JFET and the second JFET are connected common source in series such that the first JFET source and the second JFET source are shorted together at a common point S. The system further comprises a gate drive coupled to the first JFET gate and the second JFET gate, referenced to the common point S, wherein the gate drive is connected to the drain $D_1$ of the first JFET only through internal circuitry of the first JFET, and is connected to the drain $D_2$ of the second JFET only through internal circuitry of the second JFET, and the gate drive is configured to apply a selective voltage bias $V_G$ to the first JFET gate and the second JFET gate, so that the system allows current to flow through the first JFET and the second JFET in the $D_1$ to $D_2$ direction or to flow through the second JFET and the first JFET in the $D_2$ to $D_1$ direction, or so that the system blocks voltages applied to $D_1$ of the first JFET and/or $D_2$ of the second JFET. The system yet further comprises a first photodetector coupled to the gate drive, wherein the first photodetector is capable of detecting light emitted by the first JFET resulting from a fault condition, wherein the first photodetector transmits a signal to the gate drive to provide the selectively biased voltage $V_G$ so that the system blocks voltages applied to $D_1$ of the first JFET and/or $D_2$ of the second JFET, in response to the detection of light emitted by the first JFET.

In a preferred embodiment, the system further comprises a second photodetector coupled to the gate drive, wherein the second photodetector detects light emitted by the second JFET resulting from a fault condition. The second photodetector transmits a signal to the gate drive to provide the selectively biased voltage $V_G$ so that the system blocks voltages applied to $D_1$ of the first JFET and/or $D_2$ of the second JFET, in response to the detection of light emitted by the second JFET.

In another preferred embodiment, a unidirectional configuration employing one JFET and a photodetector is contemplated, and is explained with more specificity below.

The present invention is also directed to methods corresponding to the above systems.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
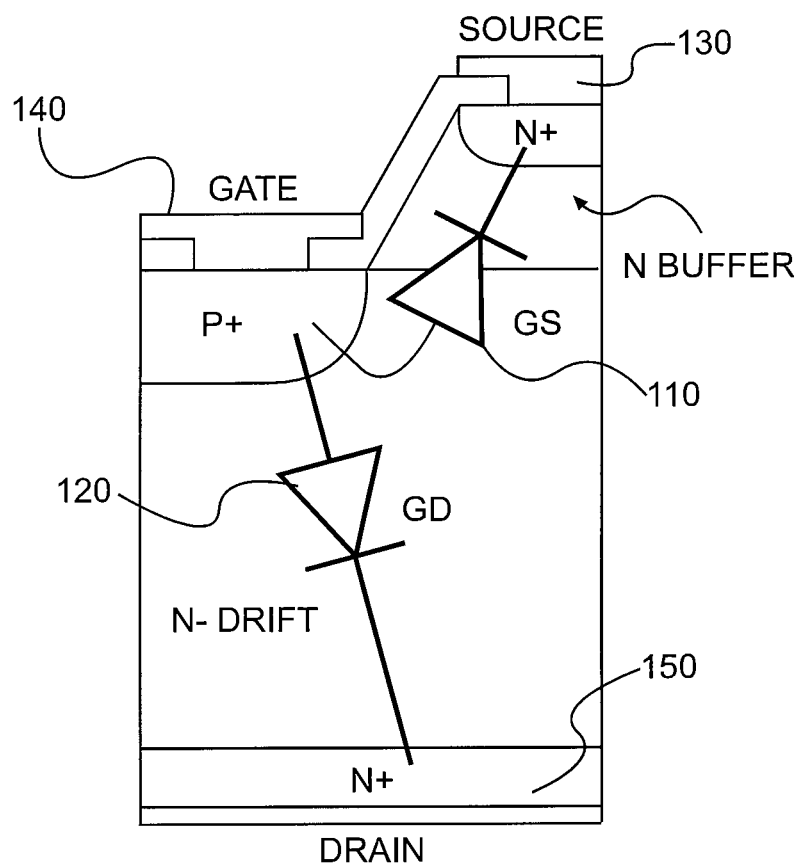
FIG. 1 is a diagram illustrating a prior art high-voltage silicon carbide vertical channel junction field-effect transistor (JFET).

It is to be understood that the figures and descriptions of the present invention may have been simplified to illustrate elements that are relevant for a clear understanding of the present invention, while eliminating, for purposes of clarity, other elements found in a typical circuit breaker or typical field-effect transistor. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Silicon devices are technologically mature but suffer from high conduction and switching losses, low bandwidth, and are limited to about 125° C. operation. Silicon carbide (SiC) and gallium nitride (GaN) are typically excellent materials for such bi-directional power conditioning since they can block high voltages with relatively low associated conduction and switching losses. Several SiC power devices are candidates for bi-directional power conditioning, such as SiC bipolar junction transistors (BJTs), SiC metal oxide semiconductor field-effect transistors (MOSFETs), lateral-channel vertical junction field-effect-transistors (JFETs), and vertical-channel junction-field-effect-transistors JFETs.

SiC BJTs currently suffer from forward voltage degradation (which is a reliability issue) and have a relatively low current-gain that complicates and increases the size of the gate drive. Also, SiC BJT current-gain deteriorates with temperature, limiting operation to below 200° C. SiC MOSFETs suffer from low mobility and reliability stemming from its native gate oxide. SiC MOSFET temperature operational range is limited to ~200° C. due to its gate oxide instability and threshold-voltage-shift. SiC lateral-channel vertical JFETs have relatively high resistance (e.g., lateral-channel vertical JFETs typically have twice the resistance of vertical-channel JFETs), and inherent fabrication complexities. SiC vertical-channel JFETs are ideal candidates for bidirectional power flow applications as they have low switching and conduction losses, are relatively easy to fabricate, and can operate at temperatures in excess of 300° C.

Embodiments of a system and method for providing symmetric, efficient bi-directional power flow and power conditioning are described herein. Embodiments provide a more energy efficient system for bi-directional flow that can operate at high temperatures, such as at 300° C., high frequencies, high current-gain, and has no native gate-oxide or forward-voltage degradation reliability concerns. Embodiments may include SiC JFETs in a common-source configuration, with specified biasing settings, to provide efficient and symmetrical bi-directional power flow and power conditioning. Such embodiments provide a SSCB that overcomes problems described above. JFETs do not have native gate-oxide or forward-voltage degradation reliability concerns, have been operated at 300° C. and can be operated at high-current gain.

With reference now to FIG. 1, shown is an embodiment of a SiC JFET 100 that may be used in the common source configuration described above. JFET 100 includes a gate-to-drain (GD) pn junction 120, i.e., GD diode, and a gate-to-source (GS) pn junction 110, i.e., GS diode. JFET 100 also includes a source terminal 130, a gate terminal 140, and a drain terminal 150. FIG. 1 also illustrates the various p+ (gate), n+ (source), n− drift (drift layer) and n+ (buffer and substrate) regions of JFET 100. Although JFET 100 is fabricated from silicon carbide (SiC), other materials suitable for high-voltage applications, such as gallium nitride (GaN), gallium arsenide (GaAs), and diamond can be used.

Figure 2:
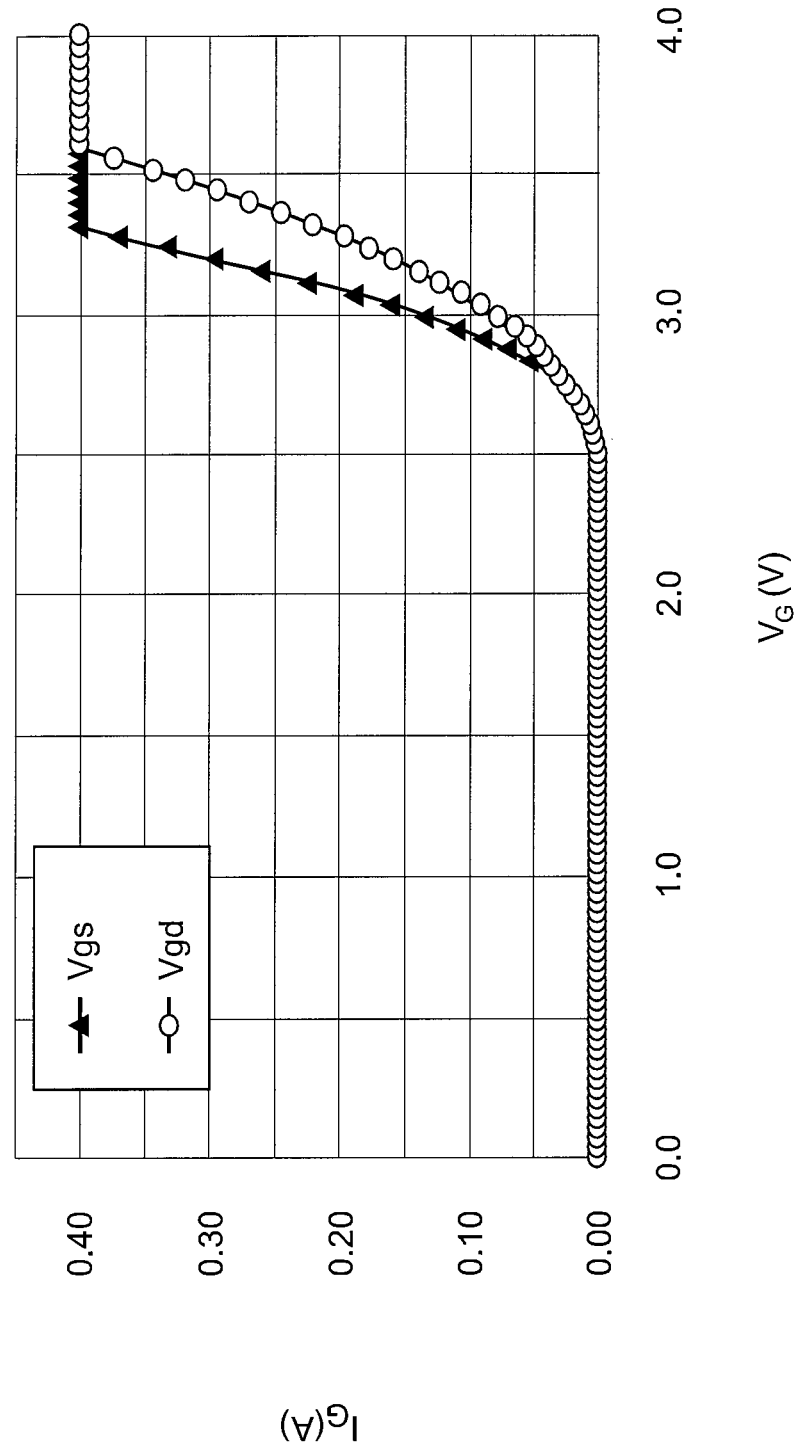
FIG. 2 is a graph illustrating forward gate-to-source and gate-to-drain voltage bias characteristics of a prior art high-voltage SiC JFET.

With reference now to FIG. 2, shown is a graph illustrating forward GS pn junction 110 and GD pn junction 120 characteristics of a JFET such as JFET 100. Specifically, the graph illustrates gate-current as a function of gate-to-source bias ($V_{GS}$) and gate-to-drain bias ($V_{GD}$). As shown, for doping levels relevant to power conditioning applications such as in the embodiments described herein, the wide, band-gap of SiC power devices may lead to GS pn junction and GD pn junction built-in potentials (turn-on) of about 2.7 V.

With reference again to FIG. 1, the GS pn junction 110 typically has a breakdown voltage of less than 100 V and may be used to control the current flow through the JFET 100. The GD pn junction 120 typically has a breakdown voltage that is primarily determined by the thickness and doping levels of the JFET 100 drift layer (n− drift), and blocks the high voltages present in power conditioning applications. Typical JFET gate-to-drain pn junctions block from a few hundred to tens of thousands of volts.

An important characteristic for efficient power JFET gate-drive operation is maintaining high current-gain voltage-control capability by biasing the gate-to-source and gate-to-drain pn junctions below their built-in potential values. If the gate voltage exceeds these values bipolar gate-current is generated, current-gain deteriorates exponentially, and significant current-handling capability may be needed of the gate drive, which may result in increased physical-size and conduction losses. Bipolar gate-current will reduce switching speed, which increases switching losses and limits switching frequency. In addition, under bipolar gate-to-drain current flow (gate-to-drain junction turned on), electron-hole pair recombinations at basal-plane-dislocations in the drift layer of the JFET may induce stacking fault formation and expansion, which may cause forward voltage degradation and eventual device failure. Accordingly, for efficient gate-drive operation the JFET's gate junctions need to be biased below their turn-on voltages. Under this gate biasing condition and for low-resistance on-state conduction, JFETs capable of blocking in excess of 1200 V are typically designed normally-on (N-ON), i.e., the JFETs block their specified voltage with a negative bias applied to their gates.

In the example illustrated in FIGS. 1 and 2, when the gate drive voltage $V_G$ reaches about 2.7 V or higher, the GD and GS diodes are turned on, i.e., the built-in potential of the gate is 2.7 V. The built-in potential value of a SiC JFET may vary depending on design, layer doping and thickness levels, manufacturing tolerances, passivation techniques etc. However, the gate-to-drain (GD) pn junction 120 and gate-to-source (GS) pn junction 110 must be biased below their built-in potential value, for efficient gate drive operation and device reliability. Under such circumstances, the GS and GD diodes are not turned on, very little gate current is needed, and no bipolar gate current is present.

Figure 3:
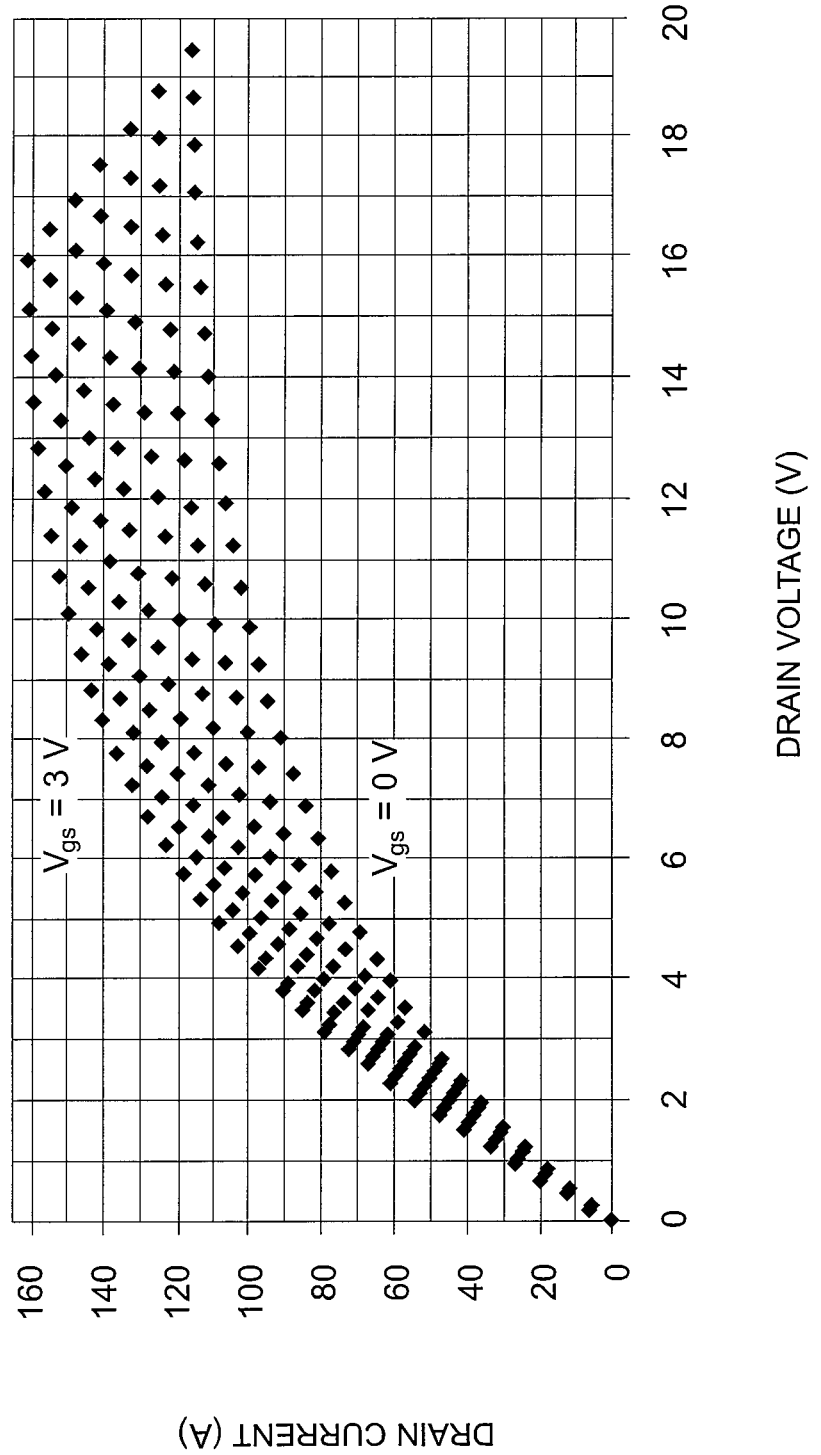
FIG. 3 is a graph illustrating on-state drain current versus drain voltage characteristics of a prior art high-voltage SiC JFET at positive gate-to-source biases.

With reference now to FIG. 3, shown is a graph illustrating typical on-state drain current characteristics versus drain voltage of a high-voltage SiC JFET, such as JFET 100. The graph shows the drain current vs. drain voltage characteristics at a gate-to-source bias $V_{GS}$ range of 0 to 3 volts in steps of 0.5 volts. As expected, at zero gate bias ($V_{GS}$=0V), the normally-on JFET 100 conducts current.

Figure 4:
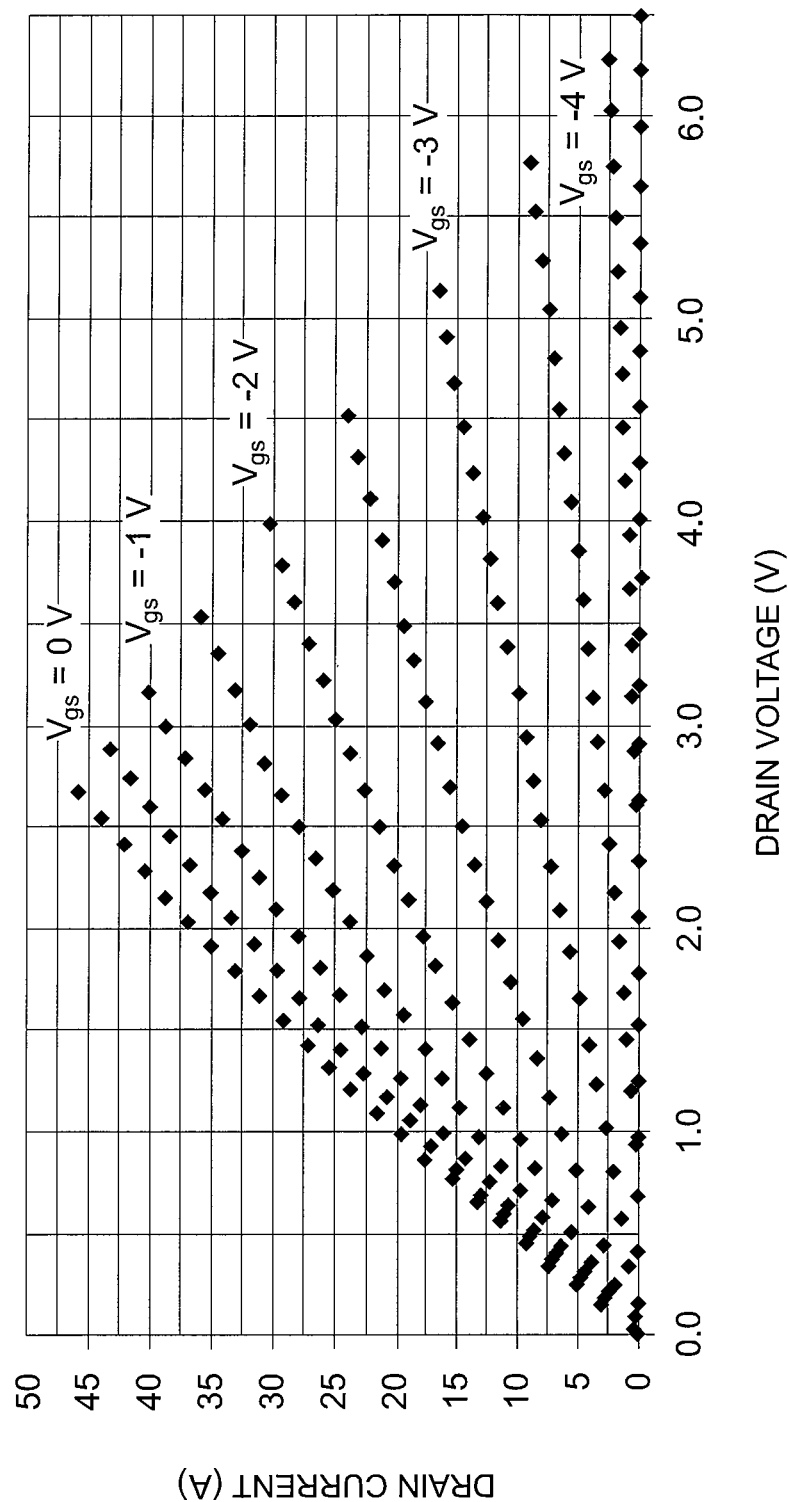
FIG. 4 is a graph illustrating on-state drain current versus drain voltage characteristics of a prior art high-voltage SiC JFET at negative gate-to-source biases.

With reference now to FIG. 4, shown is another graph illustrating typical on-state drain current characteristics versus drain voltage of a high-voltage SiC JFET, such as JFET 100, in this example for a gate-to-source bias $V_{GS}$ range of 0 to −4.5 volts in steps of 0.5 volts. At a gate-to-source bias of −4.5 volts ($V_{GS}$=−4.5 V), the channel of JFET 100 is pinched-off and negligible current flows through the drain of JFET 100.

From FIGS. 3 and 4, it is apparent that increasing the bias applied to the GS pn junction of a JFET, results in desirable higher current capability. However, as previously mentioned, the GS pn junction must biased below its built-in potential, e.g., 2.7 V, for efficient gate drive operation and reliability.

Figure 5:
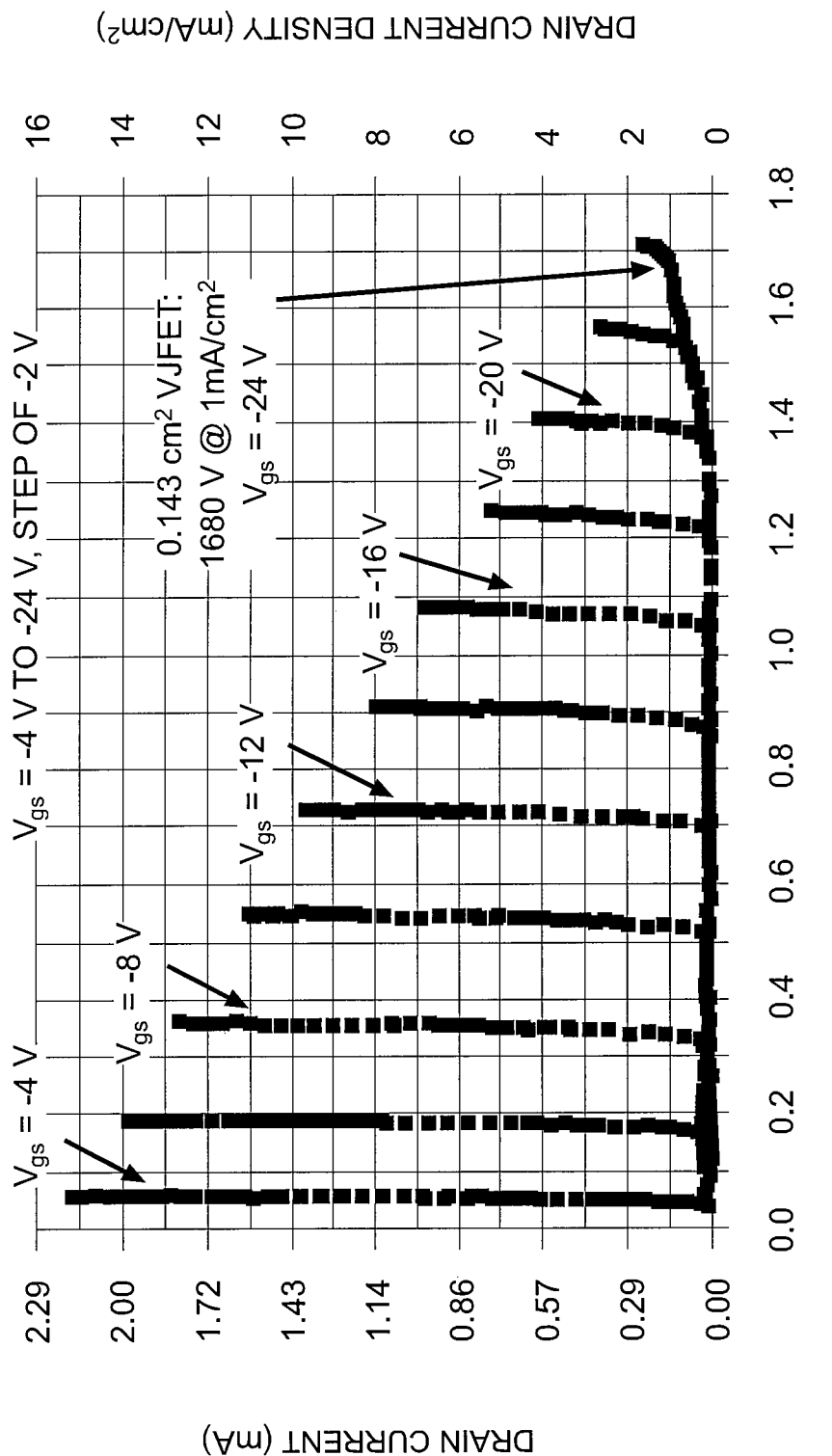
FIG. 5 is a graph illustrating example blocking-voltage characteristics of a normally-on prior art high-voltage SiC JFET.

With reference now to FIG. 5, shown is a graph illustrating example blocking-voltage characteristics of a normally-on JFET, such as JFET 100, for gate-to-source biases, $V_{GS}$, in the −4 volt to −24 volt range, in steps of −2 volts. The JFET is normally-on and a negative gate bias is needed to block a specified voltage. For example, a reverse gate-to-source bias of −18 volts ($V_{GS}$=−18 V) is needed to block a drain voltage of 1200 volts. This graph shows that very large voltages applied to the drain of a JFET, such as JFET 100, may be blocked by relatively small negative gate drive voltage.

With reference again to FIG. 1, and with consideration of the preceding graphs, when a sufficient reverse gate-to-source voltage is applied, a high drain voltage is blocked by GD pn junction 120, which becomes reverse biased when a drain voltage is applied. However, a high source voltage cannot be blocked as the GS pn junction 120 can only block low voltages and the GD pn junction 110 is forward biased for a high source voltage. Accordingly, a single JFET is not capable of bidirectional voltage blocking operation.

To enable bidirectional current and voltage operation, two JFETs can be connected in series with their sources at a common point (back-to-back source configuration). In this configuration, each JFET can have a dedicated drive biasing its gate. However, each JFET having its own dedicated drive biasing its gate leads to larger "gate drive real estate" requirements, gate-drive synchronization complexities, higher losses, and lower efficiency. Bidirectional power operation may also be achieved with two JFETs connected in series with their drains at a common point (back-to-back drain configuration). The derived gate junction biasing conditions may be the same for this case.

Figure 6:
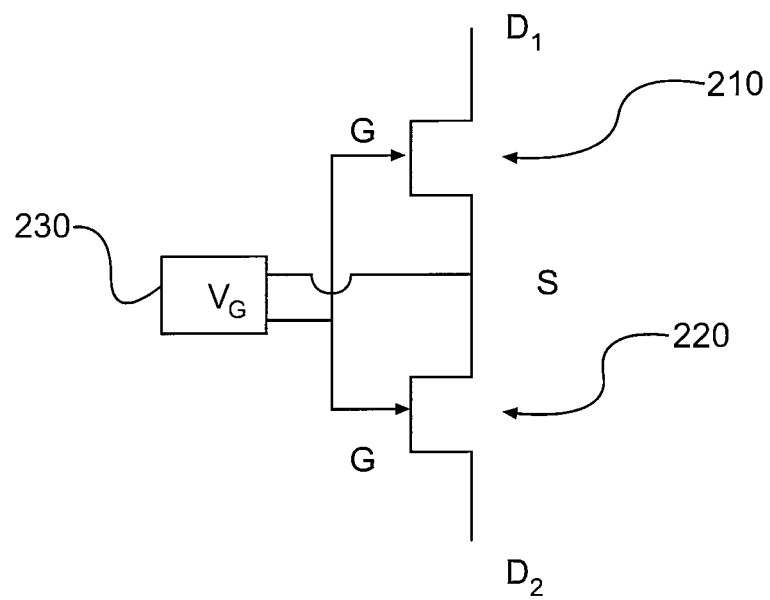
FIG. 6 is a diagram illustrating a prior art system for providing symmetric, efficient bi-directional power flow and power conditioning.

With reference now to FIG. 6, shown is a diagram illustrating an embodiment of system 200 providing symmetric, efficient bi-directional power flow and power conditioning. In system 200, two JFETs, i.e., JFET1 210 and JFET2 220, are connected in series with their sources shorted together at a common point referred to as S. Also, JFET1 210 and JFET2 220 are driven by a single gate drive 230, which applies a common, equal bias $V_G$ to their gates G. Gate drive 230 applies equal gate biases to both JFETs and is thus coupled to each gate G of JFET1 210 and JFET2 220 and is referenced to the common point S. In other words, instead of each JFET having a dedicated drive biasing its gate, one gate drive is driving both gates, simultaneously applying an equal bias to the gates G of JFET1 210 and JFET2 220. The common bias $V_G$ may be referred to as gate bias $V_G$. The gate drive 230 is referenced to the common S point where the sources of the two JFETs are shorted. JFET1 210 and JFET2 220 have separate drains, $D_1$ and $D_2$, respectively. Although JFET1 210 and JFET2 220 are fabricated from SiC, other materials suitable for high-voltage applications, such as gallium nitride (GaN), gallium arsenide (GaAs), and diamond can be used.

System 200 includes gate bias $V_G$ settings for efficient and symmetrical bi-directional power flow and power conditioning in high voltage applications requiring from a few hundred to tens of thousands of Volts. Consequently, gate drive 230 is configured to provide (a) gate biases $V_G$ that enable efficient and symmetrical bi-directional current flow through system 200 (i.e., on-state current flow from $D_1$ of JFET1 210 to $D_2$ of JFET2 220, and vice-versa) and (b) gate biases $V_G$ that block high voltages applied to $D_1$ or $D_2$ of JFET1 210 and JFET2 220, respectively. Gate drive 230 may be programmed or otherwise configured to determine when to allow power flow through JFET1 210 and JFET2 220 (i.e., when to apply gate bias (a)) and when to block voltages applied to $D_1$ or $D_2$ (i.e., when to apply gate bias (b)). Gate drive 230 may include programmed hardware (e.g., a programmed application specific integrated chip (ASIC)) or a processor and memory that includes instructions, for execution by processor, that receive various inputs, determine when to apply (a) or (b), and control gate drive 230 to apply (a) or (b). Alternatively, gate drive 230 may be configured to apply (a) or (b) based on a control signal or other input received. One of ordinary skill in the art would understand how to configure and design gate drive 230 based on the requirements of the application in which system 200 is used.

With continuing reference to FIG. 6, the below describes the appropriate gate biases $V_G$ (a) and (b) for system 200. As described above, for gate drive 230 to operate with low conduction losses, low switching losses, high frequency, and small physical size, the gate current it supplies to JFET1 210 and JFET2 220 may need to be as small as possible. Accordingly, the GD pn junctions and GS pn junctions of JFET1 210 and JFET2 220 are preferably biased below their built-in potential, e.g., ~2.7 V. In addition, biasing the GD pn junctions below their built-in potential contributes to higher JFET reliability.

Symmetrical and Bi-Directional On-State Current Flow

The following describes the gate bias $V_G$ settings for efficient symmetrical and bi-directional power flow through system 200 (i.e., bias settings (a) described above). The gate bias $V_G$ setting for current flow in the direction of $D_1$ to $D_2$ is described first.

Current Flow Direction $D_1$ to $D_2$

In the current flow direction from $D_1$ to $D_2$, the drain $D_1$ of JFET1 210 is at a higher voltage than the drain $D_2$ of JFET2 220.

From Kirchoff's law, the voltages, i.e., $V_{GD1}$ and $V_{GD2}$, across the gate-to-drain diodes, i.e., diodes between G and $D_1$ of JFET1 210 and G and $D_2$ of JFET2 220, respectively (not shown in FIG. 6—see FIG. 1) are:

$$\text{JFET1}: V_{GS}=V_{GD1}+V_{D1S} \Leftrightarrow V_{GD1}=V_{GS}-V_{D1S} \quad (1)$$

$$\text{JFET2}: V_{GS}=V_{GD2}+V_{D2S} \Leftrightarrow V_{GD2}=V_{GS}-V_{D2S} \quad (2)$$

Where $V_{D1S}$ and $V_{D2S}$ are voltages across drain-to-source i.e., between $D_1$ of JFET1 210 and $D_2$ of JFET2 220 and common source S, respectively (not shown in FIG. 6—see FIG. 1) and $V_G=V_{GS}$, since there is a common gate drive 230 and a common source S. Assuming a diode built-in potential of ~2.7 V and a safety margin of 0.2 V, $V_{GS}$, $V_{GD1}$, and $V_{GD2}$ must be less or equal to 2.5 V (see FIG. 2) for efficient low-current gate-drive operation (i.e., to avoid turning on GD and GS diodes). From FIGS. 3-4 it is seen that a $V_{GS}$ value as close as possible to 2.5 V is needed for high transistor drain current flow, with $V_{GS}$=2.5 V being the maximum. For the $D_1$ to $D_2$ current flow direction, $V_{D1S}$ is always positive and from Eq. (1) with $V_{GS}$ being 2.5 V or less, $V_{GD1}$ will always be below 2.5 V. On the other hand, $V_{D2S}$ is always negative and therefore Eq. 2 sets the maximum allowable value of $V_{GS}$:

$$V_{GD2}=V_{GS}-V_{D2S}=V_{GS}+|V_{D2S}|\leq 2.5V \Rightarrow V_{GS}\leq 2.5V-|V_{D2S}| \quad (3)$$

As an example of $D_1$ to $D_2$ current flow, a 4 volt drop across the common source JFET1 210 and JFET2 220 is assumed. For simplicity, assume the drain $D_1$ of JFET1 210 is biased at 4 volts and the drain $D_2$ of JFET2 consequently biased at 0 volts. Assuming JFETs with similar specifications and resistances, point S is at a bias of approximately 2 volts. Under these biasing conditions, $|V_{D2S}|$=2 V and from Eq. (3), the maximum gate voltage that ensures efficient operation is $V_{GS}$=0.5 V. For $V_{GS}$=0.5 V, Eqs. (1) and (2) result in $V_{GD2}$=2.5 V and $V_{GD1}$=−1.5 V. All gate pn junctions are below their built-in potential of ~2.7 V and efficient low gate drive operation is possible.

Current Flow Direction $D_2$ to $D_1$

In the current flow direction from $D_2$ to $D_1$, the drain $D_2$ of JFET2 220 is at a higher voltage than the drain $D_1$ of JFET1 210. Accordingly, in FIG. 6 the current flow is from $D_2$ to $D_1$. As in the $D_1$ to $D_2$ case, and again assuming a built-in potential of ~2.7 V and a safety margin of 0.2 V, $V_{GS}$, $V_{GD1}$, and $V_{GD2}$ must be less or equal to 2.5 V (see FIG. 2) for efficient low-current gate-drive operation. From FIGS. 3-4 it is seen that a $V_{GS}$ value as close as possible to 2.5 V is desirable for high transistor drain current flow, with $V_{GS}$=2.5 V being the maximum. For the $D_2$ to $D_1$ current flow direction, $V_{D2S}$ is always positive and from Eq. (2) $V_{GD2}$ will always be below 2.5 V for $V_{GS}$ of 2.5 V or less. On the other hand, $V_{D1S}$ is always negative and therefore Eq. (1) sets the maximum allowable value of $V_{GS}$:

$$V_{GD1}=V_{GS}-V_{D1S}=V_{GS}+|V_{D1S}|\leq 2.5V \Rightarrow V_{GS}\leq 2.5V-|V_{D1S}| \quad (4)$$

As an example of $D_2$ to $D_1$ current flow, a 4 volt drop across the common source JFET1 210 and JFET2 220 is assumed. For simplicity, assume the drain $D_2$ of JFET2 220 is biased at 4 volts and the drain $D_1$ of JFET1 210 is consequently biased at 0 volts. Assuming JFETs with similar specifications and resistances, the point S is at a bias of approximately 2 Volts. Under these biasing conditions, $|V_{D1S}|$=2 V and from Eq. (4), the maximum gate voltage that ensures efficient operation is $V_{GS}$=0.5 V. For $V_{GS}$=0.5 V, Eqs. (1) and (2) result in $V_{GD2}$=−1.5 V and $V_{GD1}$=2.5 V. $V_{GS}$, $V_{GD1}$, and $V_{GD2}$ are below their built-in potential of ~2.7 V and efficient low gate drive operation is possible.

Consequently, efficient, bi-directional common source JFETs current flow with a single gate bias $V_G$ coming from a single gate drive 230 that operates efficiently with low losses and high bandwidth meets, the following equation (for a SiC JFET with a built-in potential of ~2.7 V; for SiC JFET with a different built-in potential, or JFET fabricated from other materials with a different built-in potential, the equation below would be adjusted accordingly):

$$V_{GS}\leq 2.5V-|V_{D2S}| \text{ and } V_{GS}\leq 2.5V-|V_{D1S}| \quad (5)$$

As described above, when symmetrical, bi-directional power flow is required by the application in which system 200 is utilized, gate drive 230 will supply a single gate bias $V_G$ that satisfies these equations. Gate drive 230 may include control circuitry or software for determining the appropriate gate bias $V_G$ based on these equations and when to apply such gate bias $V_G$ in order to enable symmetrical, bi-directional power flow and when not to apply such gate bias $V_G$. Alternatively, control circuitry or software for determining when to apply such gate bias $V_G$ in order to enable symmetrical, bi-directional power flow and when not to apply such gate bias $V_G$ may be external to gate drive 230 and may simply send control signal to gate drive 230 to set gate bias $V_G$ at the appropriate level.

Bidirectional Voltage-Blocking

The following describes the gate bias $V_G$ settings for high-voltage power conditioning through system 200 (i.e., high-voltage blocking bias settings (b) described above). As illustrated in FIG. 5, system 200 can block voltages from 0V to multiple Kilovolts (kV). In high-voltage applications, the voltages that system 200 would typically block would be in the Kilovolt range. The maximum voltage that system 200 could block would be determined by the design and specifications of each JFET in system 200 and vary depending on the materials used to fabricate the JFETs and variations in fabrication. The gate bias $V_G$ setting for high-voltage blocking in the direction of $D_1$ to $D_2$ is described first.

Voltage Blocking Direction $D_1$ to $D_2$

When high voltages are applied to the drain of JFET1, the gate-to-drain diode of JFET1 is reverse biased and blocks the voltage (up to its specification). JFET2 does not contribute to blocking high voltage. Repeating Equations (1) and (2):

$$\text{JFET1}: V_{GS}=V_{GD1}+V_{D1S} \Leftrightarrow V_{GD1}=V_{GS}-V_{D1S} \quad (1)$$

$$\text{JFET2}: V_{GS}=V_{GD2}+V_{D2S} \Leftrightarrow V_{GD2}=V_{GS}-V_{D2S}=V_{GS}+V_{SD2} \quad (2)$$

Typical blocking-voltage characteristics of a normally-on JFET are shown in FIG. 5. A negative $V_{GS}$ bias must be applied to block the specified high voltage. In equation (1), $V_{GS}$ is negative for voltage-blocking and $V_{D1S}$ is a positive high voltage. Therefore $V_{GD1}$ is negatively biased, and both the gate-to-drain and gate-to-source diodes of JFET1 are reverse biased, which allows for low gate-current operation.

JFET2 experiences the same negative $V_{GS}$ bias needed by JFET1 to block high voltage. Because of the voltage-blocking a leakage current below a few microamperes, $I_{SD2}$, flows from $D_1$ to $D_2$. $V_{SD2}=I_{SD2}*R_{SD2}$ is positive and in the micro-volt range and the sum of $V_{GS}$ $V_{SD2}=V_{GD2}$ is a negative voltage. Therefore, both the gate-to-drain pn junction and the gate-to-source pn junction of JFET2 are also reverse biased, which allows for low gate-current operation.

In summary, in the $D_1$ to $D_2$ blocking-voltage mode, both normally-on common source JFET1 210 and JFET2 220 have their gate-to-source and gate-to-drain diodes reverse biased allowing for efficient gate-drive operation. The gate-to-drain diode of JFET1 is reverse biased and blocks the high voltage The gate bias $V_G$ setting for high-voltage blocking in the direction $D_2$ to $D_1$ (the $D_2$ to $D_1$ blocking-voltage mode) is demonstrated below:

Voltage Blocking Direction $D_2$ to $D_1$

When high voltages are applied to the drain $D_2$ of JFET2, the gate-to-drain diode of JFET2 is reverse biased and blocks the voltage (up to its specification). JFET1 does not contribute to blocking high voltage. Repeating Equations (1) and (2):

$$\text{JFET1}: V_{GS}=V_{GD1}+V_{D1S} \Leftrightarrow V_{GD1}=V_{GS}-V_{D1S}=V_{GS}+V_{SD1} \quad (1)$$

$$\text{JFET2}: V_{GS}=V_{GD2}+V_{D2S} \Leftrightarrow V_{GD2}=V_{GS}-V_{D2S} \quad (2)$$

Typical blocking-voltage characteristics of a normally-on JFET are shown in FIG. 5. A negative $V_{GS}$ gate bias must be applied to block the specified high voltage. In equation (2), the $V_{GS}$ of JFET2 is negative for voltage-blocking and $V_{D2S}$ is a positive high voltage. Therefore, $V_{GD2}$ is negatively biased, and both the gate-to-drain and gate-to-source diodes of JFET2 are reverse biased, which allows for low gate-current operation.

JFET1 experiences the same negative $V_{GS}$ bias needed by JFET2 to block high voltage. Because of the voltage-blocking, a leakage current below a few microamperes $I_{SD1}$ flows from $D_2$ to $D_1$. $V_{SD1}=I_{SD1} \cdot R_{SD1}$ is positive and in the micro-volt range and the sum of $V_{GS}$ $V_{SD1}=V_{GD1}$ is a negative one. Therefore, both the gate-to-drain and gate-to-source diodes of JFET1 are reverse biased, which allows for low gate-current operation.

In summary, in the $D_2$ to $D_1$ blocking-voltage mode, both normally-on common source JFET1 210 and JFET2 220 have their gate-to-source and gate-to-drain diodes reverse biased allowing for efficient gate-drive operation. The gate-to-drain diode of JFET2 is reverse-biased and blocks the high voltage.

As described above, when a $D_1$ to $D_2$ blocking-voltage mode or $D_2$ to $D_1$ blocking-voltage mode is required by the application in which system 200 is utilized, gate drive 230 will supply a single gate bias $V_G$ that satisfies the above equations. Gate drive 230 may include control circuitry or software for determining the appropriate gate bias $V_G$ based on these equations and determining when to apply such gate bias $V_G$ in order to enable $D_1$ to $D_2$ or $D_2$ to $D_1$ blocking-voltage modes and when not to apply such gate bias $V_G$. Alternatively, control circuitry or software for determining the appropriate gate bias $V_G$ and when to apply such gate bias $V_G$ may be external to gate drive 230 and may simply send control signal to gate drive 230 to set gate bias $V_G$ at the appropriate level.

Figure 7:
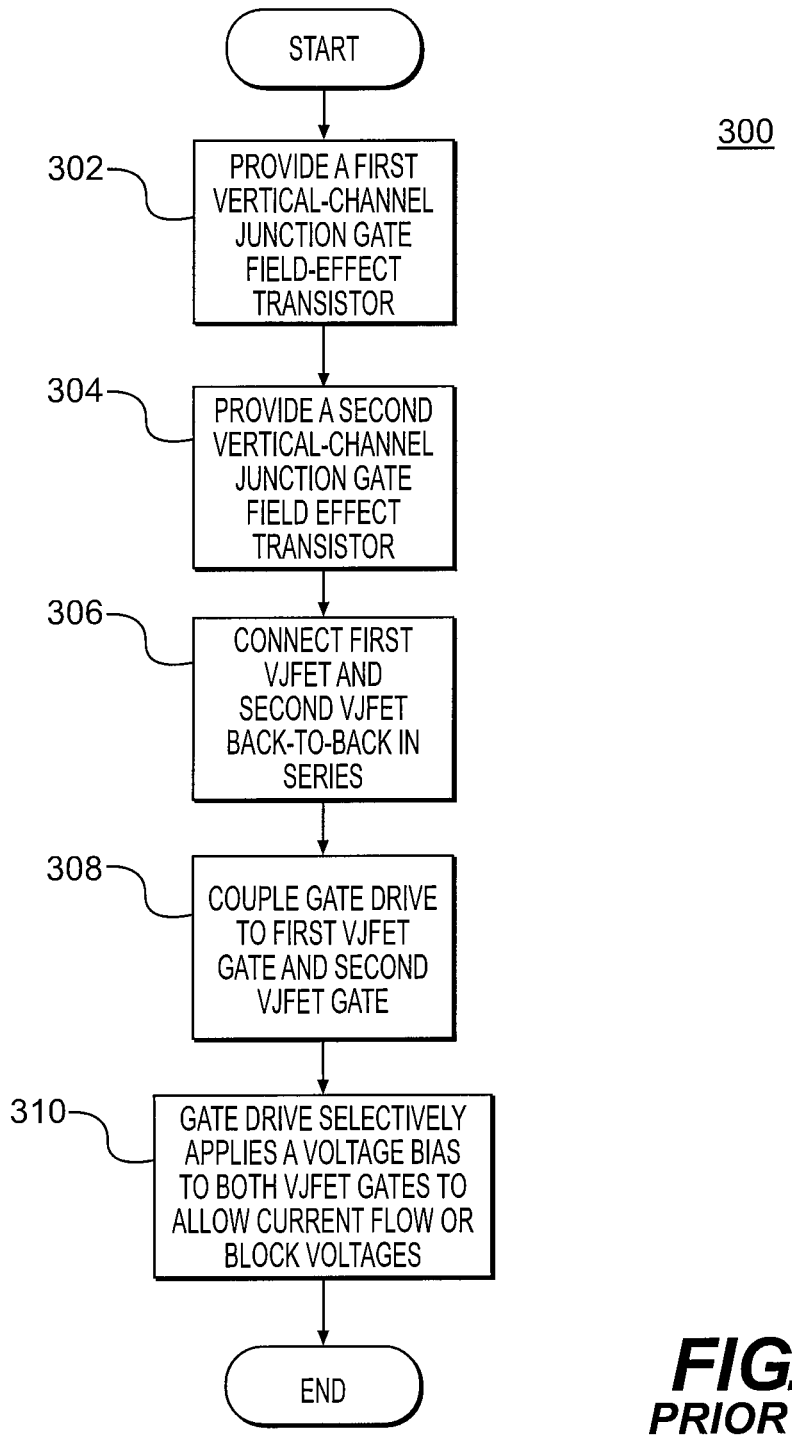
FIG. 7 is a flowchart illustrating a prior art method for providing symmetric, efficient bi-directional power flow and power conditioning.

With reference to FIG. 7, shown is a flowchart of an embodiment of method 300 for providing symmetric, efficient bi-directional power flow and power conditioning. Method 300 provides a first vertical-channel junction gate field-effect transistor (JFET), block 302. As shown above, the first JFET includes a gate, drain ($D_1$) and source and has gate-to-drain and gate-to-source built-in potentials. A second JFET that includes a gate, drain ($D_2$) and source and has gate-to-drain and gate-to-source built-in potentials is also provided, block 304. The first JFET and the second JFET are connected common source (back-to-back) in series, block 306, so that the first JFET source and the second JFET source are shorted together at a common point S. A gate drive is coupled to the first JFET gate and the second JFET gate, block 308. The gate drive selectively applies an equal voltage bias ($V_G$) to both the first JFET gate and the second JFET gate, block 310, so that current flows through the first JFET and the second JFET in the $D_1$ to $D_2$ direction or current flows through the second JFET and the first JFET in the $D_2$ to $D_1$ direction or so that voltages applied to $D_1$ of the first JFET or $D_2$ of the second JFET are blocked. The gate drive may selectively apply $V_G$ to allow current to flow through the first JFET and the second JFET in the $D_1$ to $D_2$ direction by setting $V_G$ equal to or less than the gate-source built-in potential of the first JFET minus the absolute value of the voltage measured across $D_2$ to S, as shown above. Likewise, the gate drive may selectively apply $V_G$ to allow current to flow through the second JFET and the first JFET in the $D_2$ to $D_1$ direction by setting $V_G$ equal to or less than the gate-source built-in potential of the second JFET minus the absolute value of the voltage measured across $D_1$ to S, as shown above. The gate drive may selectively apply $V_G$ to block voltages applied to $D_1$ of the first JFET by setting $V_G$ equal to or less than a negative voltage sufficient to block the applied voltage. The sufficient negative voltage is determined by the blocking voltage characteristics of the first JFET, as shown above (see FIG. 5). Moreover, the gate drive may selectively apply $V_G$ to block voltages applied to $D_2$ of the second JFET by setting $V_G$ equal to or less than a negative voltage sufficient to block the applied voltage. The sufficient negative voltage is determined by the blocking voltage characteristics of the second JFET. The gate drive may determine $V_G$ internally or from receiving a control signal.

Figure 8:
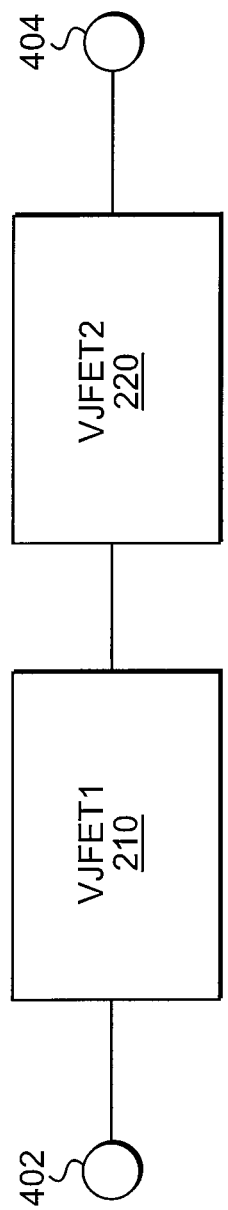
FIG. 8 is a block diagram illustrating a prior art system for providing symmetric, efficient bi-directional power flow and power conditioning in a high-voltage application.

With reference now to FIG. 8, shown is an embodiment of system 200 in a high-voltage application with high-voltage input/output points 402 and 404. It is important to note that system 200 works to provide symmetric, efficient bi-directional power flow and power conditioning using two high voltage JFETs connected in series without requiring additional devices, circuitry or components between them. Unlike U.S. Patent Application Publication 20060098363 to Hebert et al. ("Hebert"), system 200 simply provides two common source connected high voltage JFETs with their sources connected together at a common point S (and a gate drive that provides a common gate bias, $V_G$, to operate the JFETs). System 200 requires only two high voltage JFETs with no circuitry between them, while Hebert requires substantial additional circuitry between its high voltage devices; for example, as shown in FIG. 4 of Hebert (which does not show the gate drive circuitry required to operate the two high voltage devices and the three devices between them), Hebert requires at least three devices and two sets of diode/resistor or combination elements between high voltage devices. Hebert does use an integrated circuit (IC) between high voltage devices, but the IC simply incorporates all of the devices shown as necessary in FIG. 4 of Herbert. As shown in FIG. 8, system 200 includes two high voltage JFET devices 210 and 220 in order to provide symmetric, efficient bi-directional power flow and power conditioning between the input/output points 402 and 404.

Embodiments of system 200 may be used for a variety of applications. For example, embodiments of system 200 may be used as a solid-state circuit breaker to provide bi-directional fault isolation in a fraction of a microsecond in power electronic circuits, such as those used in hybrid vehicles. Presently used mechanical contactors may be too slow and suffer severe degradation during repeated fault isolation. Embodiments of system 200 do not suffer such degradation.

Likewise, embodiments of system 200 may also be used for Army's hybrid military ground vehicles. Additionally, embodiments of system 200 may be used by the Air-Force for their latest generation fighter aircraft 270 DC power system, and by the Navy for their high-voltage ship systems. Embodiments of system 200 may eventually be present in every hybrid vehicle and every power circuit that needs fault protection.

The bi-directional power flow enabled by embodiments of system 200 enables regeneration applications. Industrial applications can reap significant energy savings by returning otherwise wasted energy to AC mains. Examples of such industrial applications that can utilize embodiments of system 200 include rolling mills, conveyor belts, and elevators. In electric-gasoline hybrid vehicles, bidirectional power flow may be needed for the battery to provide a cold start and to receive and store the regenerated energy from braking.

Embodiments of system 200 may also be used in photovoltaic systems interacting with the utility grid. For example, embodiments of system 200 may be used to provide bi-directional flow of solar photovoltaic power to utility AC grid and from utility AC grid to charge the photovoltaic battery bank.

Embodiments of system 200 may provide wind power transfer to the utility grid and back, such as by providing bi-directional power flow between the wind turbine generator and the utility grid.

Embodiments of system 200 may also provide fuel cell bi-directional power flow. In fuel cell hybrid vehicles, the electric drive-train motor is supplied by an inverter connected to a fuel cell. In addition, traditional chemical-power batteries are employed to provide better cold start characteristics and the option to recover braking energy. Bi-directional power flow, such as that provided by embodiments of system 200 are needed to interface the chemical-power battery with the fuel cell.

In short, embodiments of system 200 enable power flow in multiple directions that saves energy and allows interface of power sources with the grid. Current silicon circuitry cannot operate at high temperatures and is less energy efficient. Common source, SiC, other similar composition, JFETs configured as in system 200 with bias settings as described herein operate fast enough for these applications, do not degrade with faults, can operate at high temperatures and are more energy efficient than current silicon circuitry.

Although in the exemplary embodiments above, JFETs 210 and 220 have been connected common source with their sources at a common point S, one skilled in the art will recognize that similar results can be obtained by connecting the two JFETs common drain with their drains at a common point S.

To reiterate, in FIG. 6, two JFETs connected in series with their sources at a common point (back-to-back source configuration) are capable of bidirectional current flow and bidirectional voltage blocking. A single gate drive provides bias to the JFETs for voltage blocking or current conduction. FIG. 6 is a schematic of two vertical channel JFETs connected in series with their sources at a common point (S), and with a common bias $V_{GS}$ applied to their gates by the gate drive.

Figure 9:
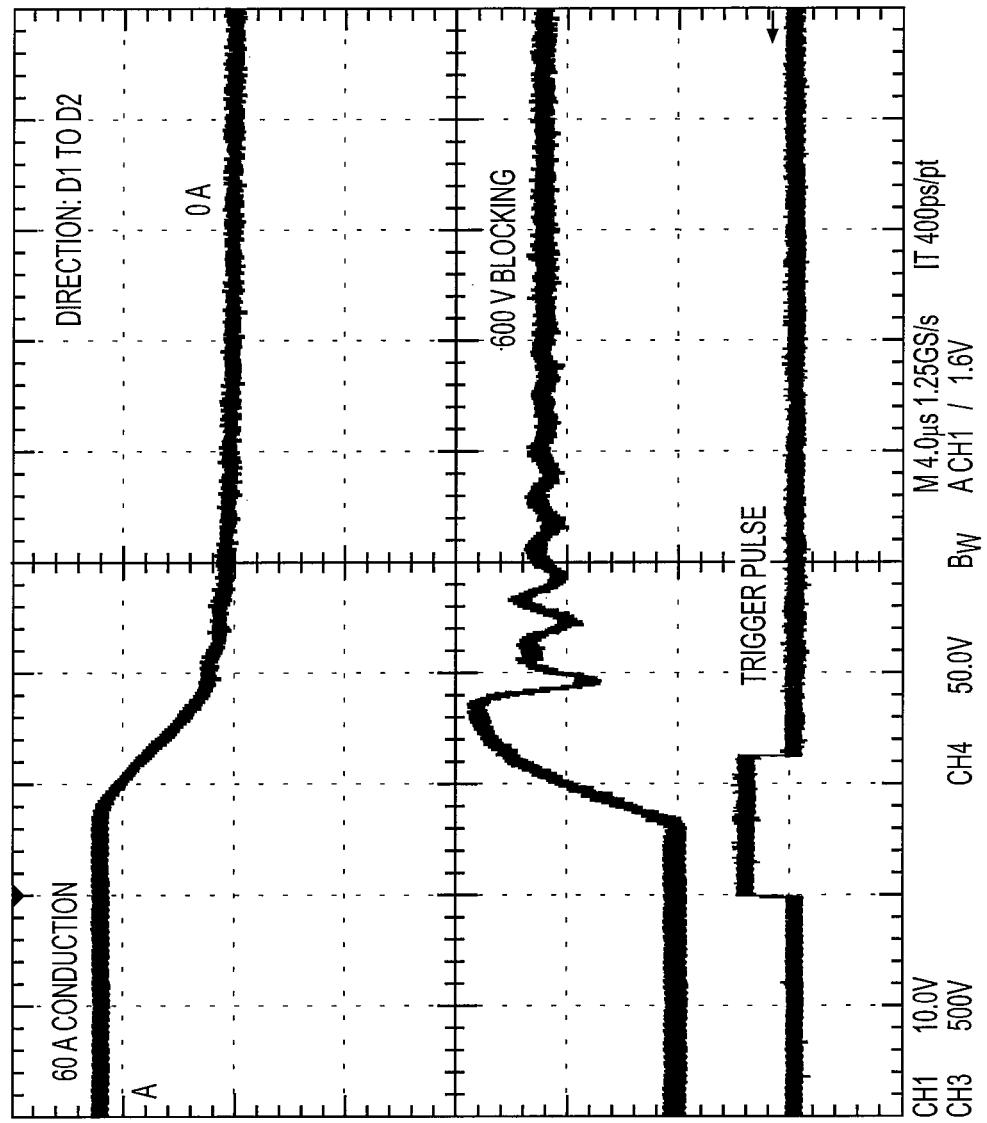
FIG. 9 is a graph illustrating current conduction in the D1 to D2 direction and corresponding voltage blocking for the common-source connected JFETs illustrated in FIG. 6.

Numerous demonstrations have established bidirectional voltage blocking and current conduction using multiple parallel pairs of common-source connected SiC JFETs, as in FIG. 6. The demonstrations have also shown blocking-mode circuit shut down in microseconds, more than three orders of magnitude faster that the mechanical circuit breakers used presently. An example is given in FIG. 9 for 60-A current conduction in the D1 to D2 direction and blocking of 600 V (900 V peak) at D1. FIG. 9 is a graph depicting current direction D1 to D2 600 V, 60 A turn-OFF transition.

Figure 10:
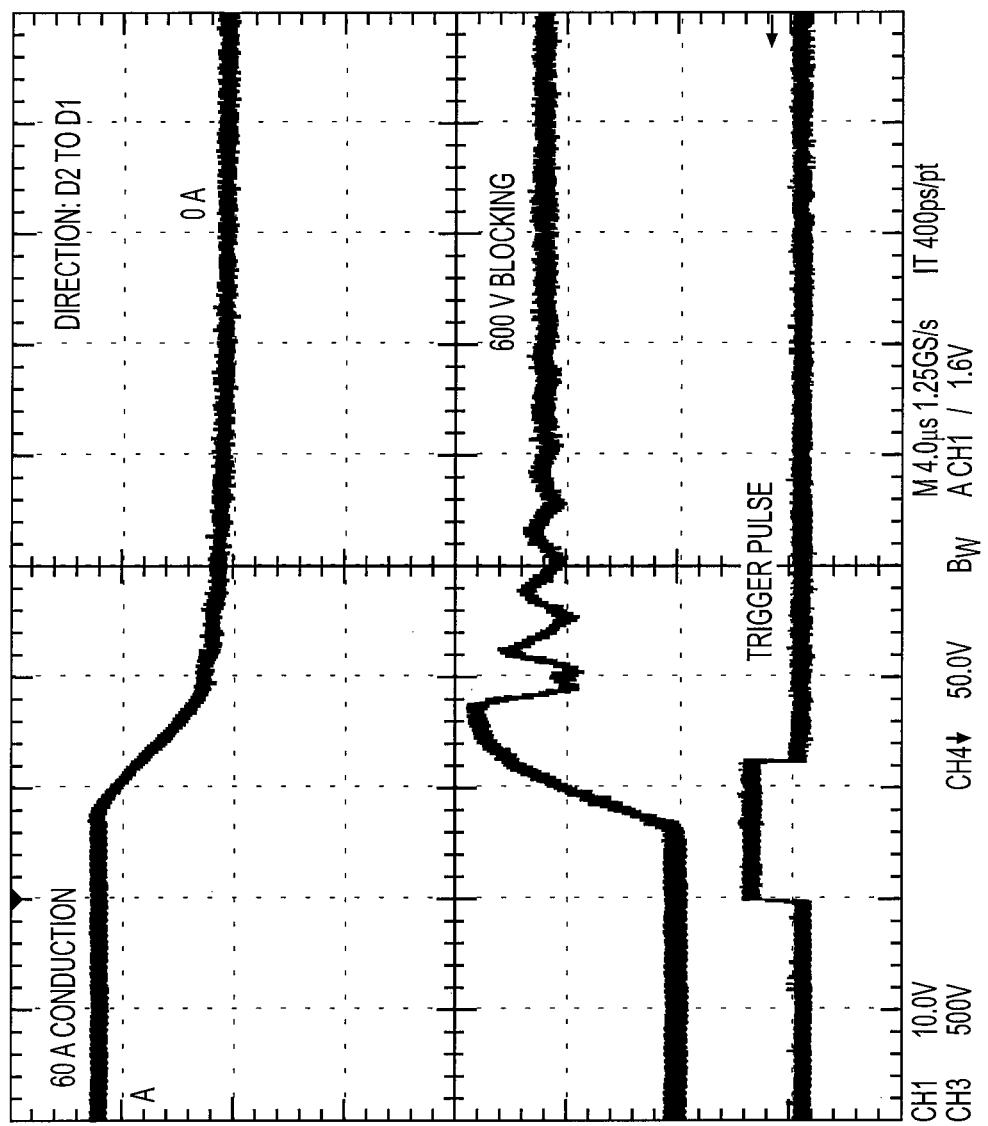
FIG. 10 is a graph illustrating current conduction in the D2 to D1 direction and corresponding voltage blocking for the common-source connected JFETs illustrated in FIG. 6.

In the opposite D2 to D1 direction, that same circuit conducts 60-A current and blocks of 600 V (900 V peak) at D2, FIG. 10. FIG. 10 is a graph depicting current direction D2 to D1 600 V, 60 A turn-OFF transition.

For reference, a typical JFET is shown in FIG. 1, with the gate-source and gate-drain pn junctions denoted. JFETs are designed to conduct current from drain to source. Drain-source conduction will always bias the gate-drain junction negatively, i.e., the gate-drain junction will be off and no bipolar current flows. In the common-source configuration of FIG. 6, one of the JFETs will conduct current from drain to source and the other from source to drain (reverse conduction). For the JFET conducting source to drain, increase in current leads to an accompanying increase in voltage, which biases the gate-drain junction positively and can lead to its turn-on manifested in bipolar gate-drain current generation.

In FIG. 6, it was shown that in the common source JFET pair configuration and for high efficiency, the gate-source and gate-drain pn junctions of the JFETs must be off at all times. This means that bipolar current flow (electrons and holes) is not present in the junctions. Voltage bias conditions that satisfy this requirement were derived in Eqs. (3) and (4) and are repeated below:

$$V_{GS} \leq 2.7\text{V} - |V_{D2S}| \quad (3)$$

$$V_{GS} \leq 2.7\text{V} - |V_{D1S}| \quad (4)$$

In summary, in no "fault operation" of the circuit of FIG. 6, current flows efficiently and all JFET junctions are off. In the case of a "fault", the rise in current/voltage and/or temperature rapidly turns on the gate-drain junction of the reverse conducting JFET and an, exponentially increasing bipolar current is generated. The present invention provides a method and system for over current/voltage/temperature circuit breaker protection triggered by bipolar current.

In order to be able to block voltage bidirectionally, the two SiC JFET transistors need to be placed common source as shown in FIG. 6. As mentioned above, when utilizing this common source configuration, current is able to flow in either direction and voltage is able to be held in either direction thereby functioning as a circuit breaker. For example, in the case of a hybrid vehicle, a battery is employed that feeds a motor. If an overcharge in the battery exists and you don't have protection, the high current or rapid discharge will burn out the motor. On the other hand, during breaking, or in other energy-capturing situations, energy may be captured to charge the battery. If there is a short, a potentially large amount of energy is transmitted to the battery and often results in burning out of the battery. As a result, isolation of the battery from the electronics by utilization of a circuit breaker is required.

If there is a high current from D1 side because of a malfunction then you can sense a very large increase in current and apply a negative voltage at the gate that will stop the current from flowing. For example, a JFET typically can block 1200V, and if you have a 600V battery that starts to discharge rapidly, the 600V can be applied across the switch and no current will flow because there is no voltage differential. The reason why you need two common source connected JFETs in this example is because blocking can only occur from the JFET's drain side. The gate controls operation of the JFET transistor. If the gate signal is in one position it allows current to flow therethrough. If the gate signal biases the JFET transistor differently, then the transistor is capable of halting a predetermined high voltage depending on the transistor's rating.

In a configuration such as that shown in FIG. 6, if a fault occurs on the D1 side and blocking mode is desired, instead of conducting the current, a rapid increase in current is detected in the first JFET 210. Then, with the sensing of the high current with electronics, an abnormally high current is determined. As a result of which, a negative voltage is applied on the gate-source of the first JFET that will stop the abnormally high current flow. For the two JFETs to operate efficiently, you want to have as low losses as possible occurring from the gate drive, which is achieved when Eqs. (3) and (4) apply. As such, in conduction mode (i.e., when no fault is occurring), the $V_{gs}$, current applied on the two JFETs is negligible. Thus, there is a negligible amount of gate drive power loss because the gate drive is running a very small amount of gate control current. When the fault condition starts to occur, the gate drive current starts to rise and as a result power losses begin to occur.

It is thus desired to sense the abrupt increase in gate drive current due to a fault causing the reverse conducting JFET's gate-drain junction to generate bipolar current. Then, application of a negative bias on the gates through the gate drive blocks the abruptly increasing "fault" current flow; i.e., thereby shutting off the circuit.

Bipolar current is electron hole flow, the radiative recombination of which produces light emission. The wavelength of this light emission depends on the semiconductor material used in the fabrication of the JFETs of FIG. 6 (or other semiconductor devices used). For SiC devices, the light emission is in the blue-purple and ultraviolet range and can be detected through commercially available photodetectors, which send a signal to the gate drive to apply a sufficient negative bias on the gates to block the abruptly increasing "fault" current flow; i.e., to thereby shut off the circuit. Due to the speed-of-light detection and its lack of electromagnetic interference, this method will be highly desirable in many applications as mentioned below. For Si devices, the light emitted by the radiative recombination of electrons and holes is in the infrared wavelength range. For GaN, the light emission is primarily in the ultraviolet range.

Figure 11:
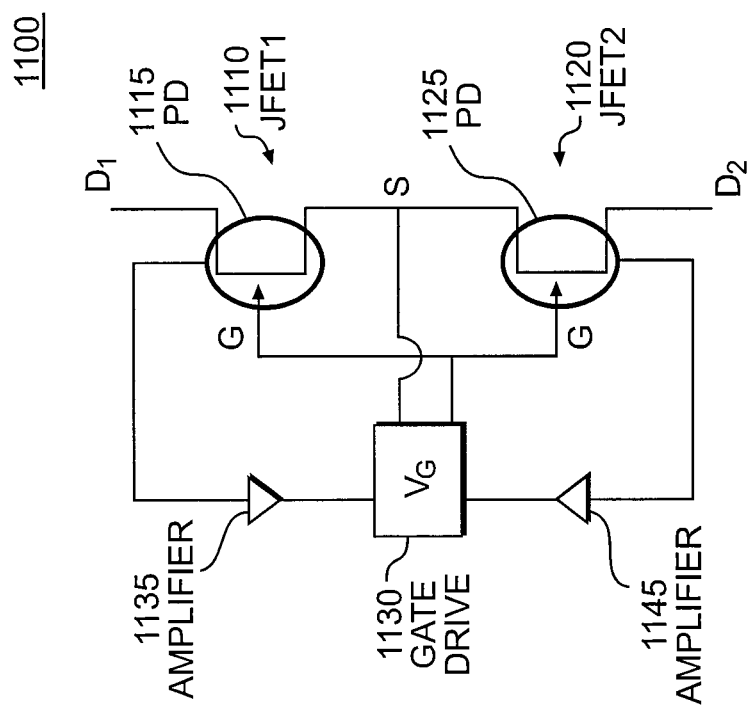
FIG. 11 is a diagram illustrating an exemplary circuit schematic of a system for providing optically triggered bi-directional circuit breaking, in accordance with a preferred embodiment of the present invention.

FIG. 11 depicts an exemplary circuit schematic of a system 1100 for providing optically triggered bidirectional circuit breaking. Photodetectors (PD) 1115 and 1125 sense the light generated by "fault condition" bipolar recombination. The electric signal of the PD, which can undergo optional amplification, triggers the gate-drive to bias the JFET gates in the blocking state that breaks (i.e., shuts off) the circuit by restricting current flow. Depending on the JFET rating, a voltage of a few hundred to thousands of kV can be held-off keeping the circuit breaker in the off state. Once the "fault" is corrected, the gate-drive biases the JFET gates to allow current conduction.

In FIG. 11, when you are in a fault mode, gate-to-drain and gate-to-source junctions are starting to turn on. A fault condition in the power system protected by the circuit breaker results in high currents, high temperatures, and high voltages that turn the gate-to-drain junction and/or gate-to-source junction on. Under normal power system operating conditions, the junctions are off and thus no light is emitted. The fault condition somewhere in the power system manifests as a turn-on of pn junctions that produce light. Although employing PDs is used as an example of radiation (light) sensing, one skilled in the art will readily recognize that other methods and techniques can be used to detect and exploit the radiation emitted under fault conditions to trigger the gate-drive to bias the JFET gates in the blocking state that breaks (i.e., shuts off) the circuit by restricting current flow.

In no-fault operation mode (i.e., when equations 3 and 4 are upheld), the two JFETs (JFET1 1110 and JFET2 1120) have all pn junctions turned off and, therefore, no light is being emitted. Failure is denoted by rapid and substantial increase in current going through the two JFETs. As a result, the conditions of equations 3 and 4 no longer apply and the internal JFET junctions are turned on. The resultant emitted radiation (blue-purple, and ultraviolet wavelengths of radiation) will be produced because of the SiC band-gap. It is noted that other light wavelengths may be emitted dependent on the transistor material. For example, if one were to employ aluminum gallium arsenide, red light would be emitted. Of course, equations 3 and 4 would be accordingly different because of the different material used. With SiC, between zero and approximately 2.6V, no light is observed. Light is essentially not perceived until approximately 2.7V. As you start exceeding 2.7V, the gate current will rapidly increase beyond that point and the gate-to-source and gate-to-drain junctions will turn on in order for the JFETs to be able to continue conducting. The conditions of equations 3 and 4 no longer apply.

When a fault condition occurs, a sharp increase in current is detected. The gate-to-drain junction(s) of the JFETs, depending on where the current is coming from, will turn on. For example, if the high current is flowing from D1 to D2 (FIG. 11), the gate-to-drain junction of the JFET2 1120 will turn on. As soon as it turns on, photodiode 1125 will detect the light emitted by the gate-to-drain junction and produce a photocurrent in response. When current increases through a fault, the abnormally high current will turn on the junctions in the JFETs, meaning light will be emitted. The photodiodes will detect the light and, with the optional use of amplifiers 1135 and 1145 to amplify the photodiodes' photocurrent responses, will send a signal to the gate drive 1130 which will have some logic in order to determine where light originated. The gate drive 1130 determines that light came from JFET1 1110 and/or JFET2 1120. If the high current fault is occurring from the D1 to D2 direction, light will be detected at the gate-to-drain junction of the JFET2 1120. If the high current fault is coming from the D2 to D1 direction, then light is detected at the gate-to-drain junction of the JFET1 1110. Negative voltage is then applied on the gate-to-source junctions of the JFETs, which makes the JFETs capable of withstanding high voltage which eliminates current flow. The common source JFET connection makes this setup bidirectional thus the device may operate in either direction. When light is emitted, there is a fault occurring. Current from the photodiode goes to the gate drive 1130 which will apply a negative voltage on the gates of both JFETs and both JFETs will block the high voltage. During the blocking, the JFETs can block, for example, 1200V of voltage with only milliamps flowing (leakage current). This leakage current is negligible/minimal.

In a unidirectional configuration, a single transistor may be employed. Similar to the common source JFET configuration, light generated by a fault condition may be used to control and shut off the circuit. In the case where unidirectional protection is required, the second JFET (JFET2 1120) is not required. Light generated from the first JFET (JFET1

1110) may be used to control the gate and shut off the circuit when you have an overflow of abnormally high current, i.e., a fault condition. An optional amplifier 1135 may be used to amplify the photocurrent response of the photodiode.

As such, in the back-to-back two JFET bidirectional configuration (common source configuration) and the single JFET unidirectional configuration, both configurations utilize the signal that's generated in fault mode (or lack of a signal that is not generated when not in fault mode) to control the gate-source voltage. The use of photodiodes to preferably detect light emission and generate a signal is highly desirable due to their simplicity, lack of electromagnetic interference, and avoidance of high leakage currents. Photodiodes are extremely quick detectors due to the speed of light operation resulting in microsecond switching versus milliseconds. This microsecond switching capability protects highly sensitive circuitry from failing.

There is a plethora of solid-state circuit breaker and renewable energy applications that require semiconductor device configurations capable of bi-directional power flow.

Some Exemplary Applications are as Follow:

Solid-State Circuit Breaker

Provides bidirectional fault isolation in a fraction of a microsecond, in power electronic circuits such as those used in industrial applications and hybrid vehicles. The mechanical contactors used presently are too slow and suffer severe degradation during repeated fault isolation.

This technology is actively sought by the Army for their hybrid military ground vehicles, by the Air-Force for their latest generation fighter-aircraft 270 DC power system, and by the navy for their high-voltage ship systems. Solid-state (semiconductor) circuit breakers will eventually be present in every hybrid vehicle and every industrial power circuit that needs fault protection.

Bidirectional Power Flow Enables Regeneration Applications

Industrial applications can reap significant energy savings by returning otherwise wasted energy to the AC mains. Examples include rolling mills, conveyor belts, and elevators. In electric-gasoline hybrid vehicles, bidirectional power flow is needed for the battery to provide a cold start and to receive and store the regenerated energy from braking.

Photovoltaic Bidirectional Power Transfer to the Utility Grid and Batteries

Bidirectional flow of solar photovoltaic power to the utility AC grid and from the utility AC grid to charge the photovoltaic battery bank are utilized.

Wind Power Transfer to the Utility Grid and Back

Bidirectional power flow between the wind turbine generator and the utility grid is utilized.

Fuel Cell Bidirectional Power Flow

In Fuel Cell Hybrid Vehicles, the electric drive-train motor is supplied by an inverter connected to a fuel cell. In addition, traditional chemical-power batteries are employed to provide better cold start characteristics and the option to recover braking energy. Bidirectional power flow is needed to interface the chemical-power battery with the fuel cells.

Figure 12:
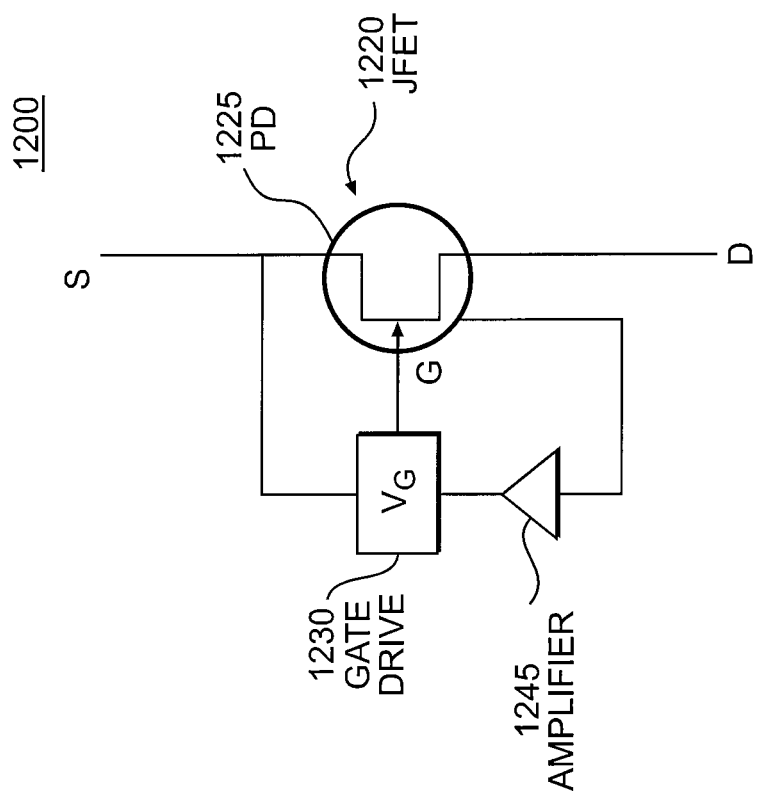
FIG. 12 is a diagram illustrating an exemplary circuit schematic of a system for providing optically triggered uni-directional circuit breaking, in accordance with a preferred embodiment of the present invention.

FIG. 12 is a diagram illustrating an exemplary circuit schematic of a system 1200 for providing optically triggered bi-directional circuit breaking using a single JFET. The system 1200 comprises a junction field-effect transistor (JFET) 1220, wherein the JFET includes a gate, drain (D), and source, and has gate-to-drain and gate-to-source built-in potentials. The system 1200 also comprises a gate drive 1230 coupled to the JFET gate, referenced to the JFET source, wherein the gate drive is connected to the drain D of the JFET only through internal circuitry of the JFET, and wherein the gate drive applies a voltage bias ($V_G$) to the JFET gate and the gate drive is configured to selectively bias $V_G$ so that the system allows current to flow through the JFET in the D to S direction or the S to D direction, or so that the system blocks voltages applied to D and/or S of the JFET. The system further comprises a photodetector PD 1225 coupled to the gate drive, wherein the photodetector is capable of detecting light emitted by the JFET resulting from a fault condition, and wherein the photodetector transmits a signal to the gate drive to provide the selectively biased $V_G$ so that the system blocks voltages applied to D and/or S of the JFET, in response to the detection of light emitted by the JFET. An optional amplifier 1245 may be used to amplify the photocurrent response of the photodiode.

Figure 13:
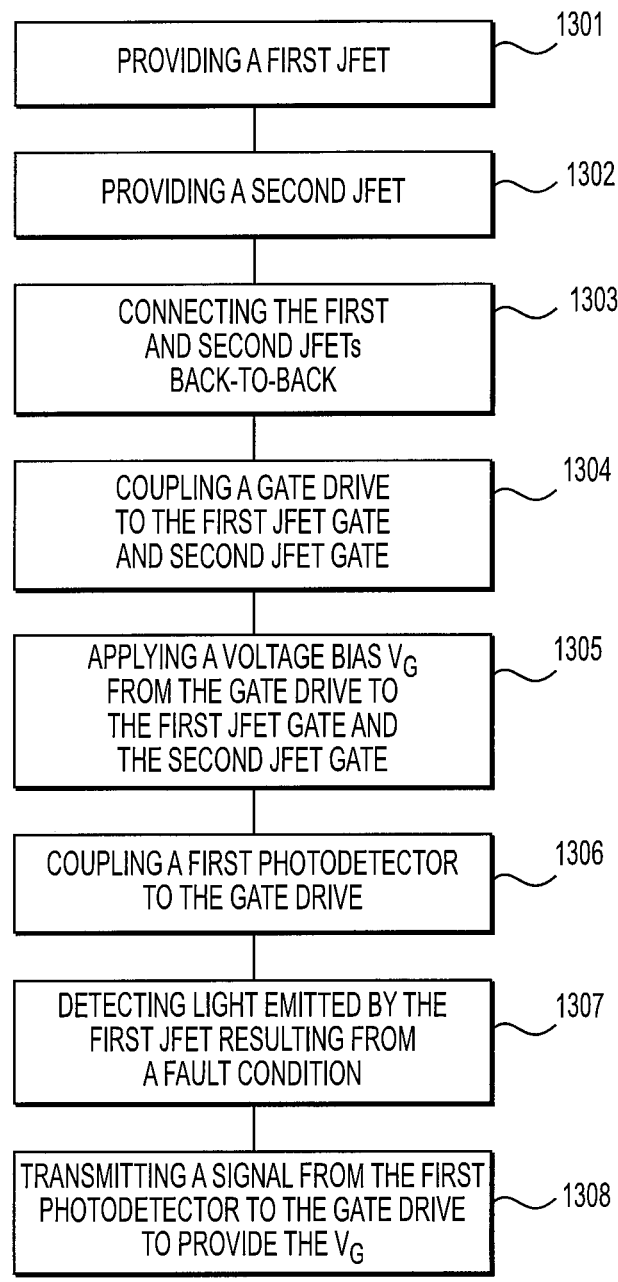
FIG. 13 illustrates an exemplary process flow of an embodiment of a method for providing an optically triggered bi-directional circuit breaker.

FIG. 13 illustrates an exemplary process flow 1300 of an embodiment of a method for providing an optically triggered bi-directional circuit breaker. The method comprises the steps of: providing a first junction field-effect transistor (JFET) 1301, wherein the first JFET includes a gate, drain ($D_1$), and source, and has gate-to-drain and gate-to-source built-in potentials; providing a second JFET 1302, wherein the second JFET includes a gate, drain ($D_2$), and source, and has gate-to-drain and gate-to-source built-in potentials; connecting the first JFET and the second JFET common source 1303 in series such that the first JFET source and the second JFET source are shorted together at a common point S; coupling a gate drive to the first JFET gate and the second JFET gate 1304, wherein the gate drive is referenced to the common point S, wherein the gate drive is connected to the drain $D_1$ of the first JFET only through internal circuitry of the first JFET, and is connected to the drain $D_2$ of the second JFET only through internal circuitry of the second JFET; selectively applying a voltage bias $V_G$ from the gate drive to the first JFET gate and the second JFET gate 1305, so that the system allows current to flow through the first JFET and the second JFET in the $D_1$ to $D_2$ direction or to flow through the second JFET and the first JFET in the $D_2$ to $D_1$ direction, or so that the system blocks voltages applied to $D_1$ of the first JFET and/or $D_2$ of the second JFET; coupling a first photodetector to the gate drive 1306; detecting light, with the first photodetector, emitted by the first JFET resulting from a fault condition 1307; and transmitting a signal from the first photodetector to the gate drive to provide the selectively biased voltage $V_G$ 1308 so that the system blocks voltages applied to $D_1$ of the first JFET and/or $D_2$ of the second JFET, in response to the detection of light emitted by the first JFET.

In another embodiment, step 1306 may comprise the coupling of a second photodetector to the gate drive. In this scenario, step 1307 may comprise the detection of light, with the second photodetector, emitted by the second JFET resulting from a fault condition. Finally, in this scenario, step 1308 may comprise the transmitting of a signal from the second photodetector to the gate drive to provide the selectively biased voltage $V_G$.

In any of the embodiments above, any JFET may be substituted with a VJFET. Or, alternatively, any VJFET may be substituted with a JFET.

Also, in any of the embodiments above, although a single gate drive is specifically utilized, multiple gate drives in place of the single gate drive in any of the above embodiments may alternatively be employed.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for providing an optically triggered bidirectional circuit breaker, the system comprising:
    a first junction field-effect transistor (JFET), wherein the first JFET includes a gate, drain ($D_1$), and source, and has gate-to-drain and gate-to-source built-in potentials;
    a second JFET, wherein the second JFET includes a gate, drain ($D_2$), and source, and has gate-to-drain and gate-to-source built-in potentials, and wherein the first JFET and the second JFET are connected in common source series such that the first JFET source and the second JFET source are shorted together at a common point S;
    a gate drive coupled to the first JFET gate and the second JFET gate, referenced to the common point S, wherein the gate drive is connected to the drain $D_1$ of the first JFET only through internal circuitry of the first JFET, and is connected to the drain $D_2$ of the second JFET only through internal circuitry of the second JFET, and the gate drive is configured to apply a selective voltage bias $V_G$ to the first JFET gate and the second JFET gate, so that the system allows current to flow through the first JFET and the second JFET in the $D_1$ to $D_2$ direction or to flow through the second JFET and the first JFET in the $D_2$ to $D_1$ direction, or so that the system blocks voltages applied to $D_1$ of the first JFET and/or $D_2$ of the second JFET; and
    a first photodetector coupled to the gate drive, wherein the first photodetector is capable of detecting light emitted by the first JFET resulting from a fault condition, wherein the first photodetector transmits a signal to the gate drive to provide the selectively biased voltage $V_G$ so that the system blocks voltages applied to $D_1$ of the first JFET and/or $D_2$ of the second JFET, in response to the detection of light emitted by the first JFET.

2. The system of claim 1, wherein the gate drive applies an equal voltage bias ($V_G$) to both the first JFET gate and the second JFET gate.

3. The system of claim 1, wherein the current flowing in the $D_1$ to $D_2$ direction is symmetric to the current flowing in the $D_2$ to $D_1$ direction.

4. The system of claim 1, wherein the first photodetector detects light emitted by the gate-drain $D_1$ junction of the first JFET.

5. The system of claim 1, wherein the first photodetector detects light emitted by the gate-source junction of the first JFET.

6. The system of claim 1, wherein the first JFET is a vertical-channel junction field-effect transistor (VJFET) and the second JFET is another VJFET.

7. The system of claim 1, wherein the first photodetector is coupled to the gate drive via an amplifier.

8. The system of claim 1, wherein the gate drive is configured to apply the selective voltage bias $V_G$ to the first JFET gate and the second JFET gate so that the system allows current to flow through the first JFET and the second JFET in the $D_1$ to $D_2$ direction or to flow through the second JFET and the first JFET in the $D_2$ to $D_1$ direction, or so that the system blocks voltages applied to $D_1$ of the first JFET or $D_2$ of the second JFET.

9. The system of claim 1, wherein the first photodetector transmits the signal to the gate drive to provide the selectively biased voltage $V_G$ so that the system blocks voltages applied to $D_1$ of the first JFET or $D_2$ of the second JFET, in response to the detection of light emitted by the first JFET.

10. The system of claim 1 further comprising a second photodetector coupled to the gate drive, wherein the second photodetector is capable of detecting light emitted by the second JFET resulting from a fault condition, and wherein the second photodetector transmits a signal to the gate drive to provide the selectively biased voltage $V_G$ so that the system blocks voltages applied to $D_1$ of the first JFET and/or $D_2$ of the second JFET, in response to the detection of light emitted by the second JFET.

11. The system of claim 10, wherein the second photodetector detects light emitted by the gate-drain $D_2$ junction of the second JFET.

12. The system of claim 10, wherein the second photodetector detects light emitted by the gate-source junction of the second JFET.

13. The system of claim 10, wherein the second photodetector transmits the signal to the gate drive to provide the selectively biased voltage $V_G$ so that the system blocks voltages applied to $D_1$ of the first JFET or $D_2$ of the second JFET, in response to the detection of light emitted by the second JFET.

14. A system for providing an optically triggered circuit breaker, the system comprising:
    a junction field-effect transistor (JFET), wherein the JFET includes a gate, drain (D), and source, and has gate-to-drain and gate-to-source built-in potentials;
    a gate drive coupled to the JFET gate, referenced to the JFET source, wherein the gate drive is connected to the drain D of the JFET only through internal circuitry of the JFET, and wherein the gate drive applies a voltage bias ($V_G$) to the JFET gate and the gate drive is configured to selectively bias $V_G$ so that the system allows current to flow through the JFET in the D to S direction or the S to D direction, or so that the system blocks voltages applied to D and/or S of the JFET; and
    a photodetector coupled to the gate drive, wherein the photodetector is capable of detecting light emitted by the JFET resulting from a fault condition, and wherein the photodetector transmits a signal to the gate drive to provide the selectively biased $V_G$ so that the system blocks voltages applied to D and/or S of the JFET, in response to the detection of light emitted by the JFET.

15. The system of claim 14, wherein the photodetector detects light emitted by the gate-drain D junction of the JFET.

16. The system of claim 14, wherein the photodetector detects light emitted by the gate-source junction of the JFET.

17. The system of claim 14, wherein the JFET is a vertical-channel junction field-effect transistor (VJFET).

18. The system of claim 14, wherein the photodetector is coupled to the gate drive via an amplifier.

19. The system of claim 14, wherein the gate drive is configured to selectively bias $V_G$ so that the system allows current to flow through the JFET in the D to S direction or the S to D direction, or so that the system blocks voltages applied to D or S of the JFET.

20. The system of claim 14, wherein the photodetector transmits a signal to the gate drive to provide the selectively biased $V_G$ so that the system blocks voltages applied to D or S of the JFET, in response to the detection of light emitted by the JFET.

21. A method for providing an optically triggered bidirectional circuit breaker, the method comprising:
    providing a first junction field-effect transistor (JFET), wherein the first JFET includes a gate, drain ($D_1$), and source, and has gate-to-drain and gate-to-source built-in potentials;

providing a second JFET, wherein the second JFET includes a gate, drain ($D_2$), and source, and has gate-to-drain and gate-to-source built-in potentials;

connecting the first JFET and the second JFET in common source series such that the first JFET source and the second JFET source are shorted together at a common point S;

coupling a gate drive to the first JFET gate and the second JFET gate, wherein the gate drive is referenced to the common point S, wherein the gate drive is connected to the drain $D_1$ of the first JFET only through internal circuitry of the first JFET, and is connected to the drain $D_2$ of the second JFET only through internal circuitry of the second JFET;

selectively applying a voltage bias $V_G$ from the gate drive to the first JFET gate and the second JFET gate, so that the system allows current to flow through the first JFET and the second JFET in the $D_1$ to $D_2$ direction or to flow through the second JFET and the first JFET in the $D_2$ to $D_1$ direction, or so that the system blocks voltages applied to $D_1$ of the first JFET and/or $D_2$ of the second JFET;

coupling a first photodetector to the gate drive;

detecting light, with the first photodetector, emitted by the first JFET resulting from a fault condition; and transmitting a signal from the first photodetector to the gate drive to provide the selectively biased voltage $V_G$ so that the system blocks voltages applied to $D_1$ of the first JFET and/or $D_2$ of the second JFET, in response to the detection of light emitted by the first JFET.

22. The method of claim 21, wherein the gate drive applies an equal voltage bias ($V_G$) to both the first JFET gate and the second JFET gate.

23. The method of claim 21, wherein the current flowing in the $D_1$ to $D_2$ direction is symmetric to the current flowing in the $D_2$ to $D_1$ direction.

24. The method of claim 21, wherein the detection of light, with the first photodetector, is emitted by the gate-drain $D_1$ junction of the first JFET.

25. The method of claim 21, wherein the detection of light, with the first photodetector, is emitted by the gate-source junction of the first JFET.

26. The method of claim 21, wherein the first JFET is a vertical-channel junction field-effect transistor (VJFET) and the second JFET is another VJFET.

27. The method of claim 21, wherein the coupling of the first photodetector to the gate drive is via an amplifier.

28. The method of claim 21, wherein the selective application of the voltage bias $V_G$ from the gate drive to the first JFET gate and the second JFET gate is performed, so that the system allows current to flow through the first JFET and the second JFET in the $D_1$ to $D_2$ direction or to flow through the second JFET and the first JFET in the $D_2$ to $D_1$ direction, or so that the system blocks voltages applied to $D_1$ of the first JFET or $D_2$ of the second JFET.

29. The method of claim 21, wherein the transmission of the signal from the first photodetector to the gate drive is performed to provide the selectively biased voltage $V_G$ so that the system blocks voltages applied to $D_1$ of the first JFET or $D_2$ of the second JFET, in response to the detection of light emitted by the first JFET.

30. The method of claim 21 further comprising:

coupling a second photodetector to the gate drive;

detecting light, with the second photodetector, emitted by the second JFET resulting from a fault condition;

transmitting a signal from the second photodetector to the gate drive to provide the selectively biased voltage $V_G$ so that the system blocks voltages applied to $D_1$ of the first JFET and/or $D_2$ of the second JFET, in response to the detection of light emitted by the second JFET.

31. The method of claim 30, wherein the detection of light, with the second photodetector, is emitted by the gate-drain $D_2$ junction of the second JFET.

32. The method of claim 30, wherein the detection of light, with the second photodetector, is emitted by the gate-source junction of the second JFET.

33. The method of claim 30, wherein the transmission of the signal from the second photodetector to the gate drive is performed to provide the selectively biased voltage $V_G$ so that the system blocks voltages applied to $D_1$ of the first JFET or $D_2$ of the second JFET, in response to the detection of light emitted by the second JFET.

* * * * *